(12) United States Patent
Serr et al.

(10) Patent No.: US 11,554,873 B2
(45) Date of Patent: Jan. 17, 2023

(54) ROTORCRAFT EQUIPPED WITH AN AERODYNAMIC DEVICE HAVING A FAIRING PROVIDED WITH A PERFORATED PLATE AT AN AIR INLET

(71) Applicant: AIRBUS HELICOPTERS, Marignane (FR)

(72) Inventors: Christophe Serr, Simiane-Collongue (FR); Olivier Honnorat, Aix en Provence (FR); Jean-Christophe Coquillat, Fuveau (FR)

(73) Assignee: AIRBUS HELICOPTERS, Marignane (FR)

( * ) Notice: Subject to any disclaimer, the term of this patent is extended or adjusted under 35 U.S.C. 154(b) by 258 days.

(21) Appl. No.: 16/848,947

(22) Filed: Apr. 15, 2020

(65) Prior Publication Data

US 2020/0346774 A1    Nov. 5, 2020

(30) Foreign Application Priority Data

Apr. 30, 2019    (FR) ...................................... 1904542

(51) Int. Cl.
  *B64D 29/04*   (2006.01)
  *B64C 21/02*   (2006.01)
  (Continued)

(52) U.S. Cl.
  CPC .............. *B64D 29/04* (2013.01); *B64C 21/02* (2013.01); *B64C 27/04* (2013.01); *B64D 33/08* (2013.01)

(58) Field of Classification Search
  CPC ........ B64D 29/04; B64D 33/02; B64D 33/08; B64C 21/02; B64C 27/04
  (Continued)

(56) References Cited

U.S. PATENT DOCUMENTS

| | | | |
|---|---|---|---|
| 3,483,676 A | * | 12/1969 | Sargisson ................ F02C 7/052 |
| | | | 55/306 |
| 3,998,048 A | | 12/1976 | Derue |

(Continued)

FOREIGN PATENT DOCUMENTS

| EP | 2871131 A1 | 5/2015 |
|---|---|---|
| FR | 2952401 A1 | 5/2011 |

(Continued)

OTHER PUBLICATIONS

French Search Report for French Application No. FR1904542, Completed by the French Patent Office, dated Jan. 14, 2020 8 pages.

(Continued)

*Primary Examiner* — Brady W Frazier
(74) *Attorney, Agent, or Firm* — Brooks Kushman P.C.

(57) ABSTRACT

A rotorcraft having an aerodynamic device arranged below a rotor, which rotor participates at least in providing lift for the rotorcraft, the rotor being mounted to rotate about an axis of rotation, the aerodynamic device having a fairing provided with at least one air inlet for enabling a stream of cool air to flow from a region that is situated outside the rotorcraft to another region that is situated inside, the air inlet being delimited by an outer peripheral portion of the fairing. In accordance with the invention, the aerodynamic device has a perforated plate provided with at least one perforation, the perforation being suitable for allowing the stream of cool air to pass through it, the perforated plate having at least one main portion shaped to match an outer shape of the outer peripheral portion of said fairing.

20 Claims, 2 Drawing Sheets

(51) Int. Cl.
  *B64C 27/04* (2006.01)
  *B64D 33/08* (2006.01)
(58) Field of Classification Search
  USPC .................................................. 244/17.11
  See application file for complete search history.

(56) References Cited

U.S. PATENT DOCUMENTS

| | | | | |
|---|---|---|---|---|
| 4,502,875 | A | 3/1985 | Ballard | |
| 5,603,472 | A * | 2/1997 | Hutter, III | F16B 35/06 411/910 |
| 5,662,292 | A * | 9/1997 | Greene | B64D 33/02 244/53 B |
| 7,866,600 | B2 * | 1/2011 | Barnard | B01D 46/58 415/121.2 |
| 8,163,050 | B2 * | 4/2012 | Belyew | B64D 33/02 55/497 |
| 8,961,634 | B2 * | 2/2015 | Boyce | F16K 31/06 55/306 |
| 9,574,497 | B2 | 2/2017 | Dailey et al. | |
| 9,656,760 | B2 * | 5/2017 | Lamb, Jr. | B64D 33/02 |
| 10,023,296 | B2 * | 7/2018 | Miller | B64C 7/02 |
| 10,105,624 | B2 * | 10/2018 | Izzi | B32B 5/26 |
| 10,266,275 | B1 * | 4/2019 | Scimone | B64D 33/02 |
| 11,124,310 | B2 * | 9/2021 | Scimone | B64D 33/04 |
| 2002/0182062 | A1 | 12/2002 | Scimone | |
| 2007/0025838 | A1 * | 2/2007 | Stelzer | B64D 33/02 415/121.2 |
| 2007/0151214 | A1 * | 7/2007 | Stelzer | B01D 46/58 55/306 |
| 2009/0007528 | A1 * | 1/2009 | Wilson | B64D 33/02 55/306 |
| 2009/0261208 | A1 * | 10/2009 | Belyew | B01D 46/10 55/306 |
| 2010/0287908 | A1 * | 11/2010 | Cunningham | B64D 33/02 60/39.092 |
| 2011/0108676 | A1 | 5/2011 | Colaprisco et al. | |
| 2014/0260127 | A1 | 9/2014 | Boyce | |
| 2015/0198296 | A1 | 7/2015 | Del Rosario | |
| 2019/0084687 | A1 | 3/2019 | Scannell et al. | |

FOREIGN PATENT DOCUMENTS

| | | |
|---|---|---|
| WO | 2015198296 A2 | 12/2015 |
| WO | 2015198296 A3 | 8/2016 |

OTHER PUBLICATIONS

Eurocopter X3 aircraft: The hybrid construction between the helicopter and the propeller plane reaches 430 km/h. International Air Show ILA. Wolfgang Bredow's aircraft dictionary. 5 pages. http://www.flugzeuglexikon.com/ILA%20-%20Luftfahrtausstellung/Hubschrauber/Eurocopter%20X3%20-%20Flugschrauber/eurocopter%20x3%20-%20flugschrauber.html, Dated Dec. 31, 2012.

Canadian Office Action (with English Machine Translation) dated Jun. 1, 2021, Application No. 3,077,617, Applicant Airbus Helicopters, 12 Pages.

* cited by examiner

ROTORCRAFT EQUIPPED WITH AN AERODYNAMIC DEVICE HAVING A FAIRING PROVIDED WITH A PERFORATED PLATE AT AN AIR INLET

CROSS-REFERENCE TO RELATED APPLICATIONS

This application claims priority to European patent application No. FR 19 04542 filed on Apr. 30, 2019, the disclosure of which is incorporated in its entirety by reference herein.

BACKGROUND OF THE INVENTION

(1) Field of the Invention

The present invention relates to the field of aviation and more particularly to the field of rotorcraft. Such aircraft have at least one rotor equipped with blades making it possible to provide lift for an aircraft, or indeed propulsion for the aircraft, in the air.

(2) Description of Related Art

More precisely, the invention applies to the field of aerodynamic devices that are arranged on the fuselage or outer skin of such a rotorcraft. Such an aerodynamic device may have a fairing making it possible, for example, to protect an engine and/or a main gearbox of a rotorcraft.

Furthermore, such fairings may be provided with one or more cool air inlets making it possible, for example, for outside air to penetrate into the fuselage of the rotorcraft in such a manner as to cool a coolant fluid circulating in a heat exchanger, or indeed in such a manner as to feed an engine of the rotorcraft with oxygen.

However, the cool air can be sucked in at different pressure levels at the air inlets. The inlet pressure of the stream of cool air can vary, in particular as a function of the suction generated by a suction member such as a motor or a fan situated downstream from the air inlet or indeed as a function of the flight phases of the rotorcraft.

In addition, the mouth of the air inlet situated on the fuselage is particularly complex to dimension.

When the rotorcraft is in a hovering flight phase, a large mouth for the air inlet makes it possible to minimize the head losses and thereby guarantees optimum operation of the fed member, such as, for example, a heat exchanger or an engine, fed with cool air by such an aerodynamic device.

However, during a forward flight phase, a large mouth can generate uncontrolled delivery of cool air, and can cause non-negligible capture drag with a risk of vibration on the tail boom and/or poor cooling of a heat exchanger.

Conversely, while the rotorcraft is in a hovering flight phase, a mouth of small dimensions generates head losses at the mouth. Such head losses can penalize the performance of a fan and/or can produce poor cooling of a heat exchanger.

Whereas while the rotorcraft is in a forward flight phase, a mouth of small dimensions makes it possible to minimize the flow rate of cool air delivered via the air inlet.

Thus, the mouth is dimensioned on the basis of a compromise or "trade-off" making it possible, in particular, to feed an engine or a heat exchanger with cool air acceptably in terms of meeting objectives while the rotorcraft is in a hovering flight phase and/or while it is in a forward flight phase.

Such a compromise can therefore induce restrictions as regards the performance of a rotorcraft and/or in terms of aerodynamic design of the fairing in general, and more specifically of the air inlet.

Furthermore, as described in Document FR 2 952 401, it is known to equip an air inlet with an outer casing or chamber mounted in front of the air inlet. Such a chamber is provided with upper orifices enabling the cool air propelled by the rotor to pass through the chamber during the hovering flight phase. In addition, the chamber is provided with a front orifice.

However, such a chamber forms an aerodynamic protuberance and can degrade the drag of the rotorcraft.

Each of Documents XP 055657028 and FR 2 952 401 also disclose an air inlet having a duct extending inside the volume delimited by the fairing and in which a grid is positioned substantially perpendicularly relative to a longitudinal direction of the duct. The grid is also arranged inside the duct of the air inlet and thus makes it possible to separate the duct longitudinally into two distinct portions.

Such a grid is generally formed by two layers of wires that are respectively mutually parallel, a first layer of parallel wires extending in a first direction being superposed on a second layer of parallel wires extending in a second direction. In such a situation, the relative positioning of the various parallel wires then makes it possible to define uniformly distributed openings between each wire crossover. The various openings are then generally of square or rectangular shape. The openings described in Documents XP 055657028 and FR 2 952 401 are thus all of square shape and are mutually identical.

Furthermore, in those documents, the sole function of the grid is to afford protection against ingestion of foreign bodies, and, under no circumstances does it make it possible, during hovering or forward flight phases of the rotorcraft, to adapt the flow rate of cool air captured by a mouth of the air inlet.

Other systems for equipping rotorcraft air inlets are disclosed in Documents U.S. Pat. Nos. 4,502,875, 3,998, 048, and EP 2 871 131, but none of the aerodynamic devices disclosed by them offers a simple and optimum solution for forming and adapting the size of an air inlet.

Document US 2019/084687 discloses an aircraft equipped with at least one air inlet positioned on a cowling. However, such an air inlet has a mouth that is totally open since a function of that air inlet is to serve as a hand hold for lifting the cowling. Such a mouth should thus be left free and unobstructed to enable an operative to take hold of the air inlet.

SUMMARY OF THE INVENTION

Therefore, an object of the present invention is to propose a rotorcraft equipped with an aerodynamic device having a fairing provided with an air inlet that is optimized, for example, for various missions or uses of the same rotorcraft.

The invention therefore provides a rotorcraft comprising an aerodynamic device arranged below a rotor, which rotor participates at least in providing lift for the rotorcraft in the air, the rotor being mounted to rotate about an axis of rotation (OZ), the aerodynamic device comprising a fairing provided with at least one air inlet for enabling a stream of cool air to flow from a region that is situated outside the rotorcraft to another region that is situated inside the rotorcraft, the air inlet(s) being delimited by an outer peripheral portion of the fairing.

In accordance with the invention, such a rotorcraft is remarkable in that, at each mouth of the air inlet(s) of the fairing, the aerodynamic device comprises a perforated plate provided with at least one perforation, the stream of cool air being able to pass through the perforation(s), the perforated plate comprising at least one main portion shaped to match an outer shape of the outer peripheral portion of the fairing.

In other words, in its main portion, such a perforated plate may, for example, be slightly convex so that it substantially matches the outer shape of the outer peripheral portion of the fairing.

Furthermore, such perforations may be formed by bores and they may also be of any shape. Thus, for example, the perforations may be formed by a machining, punching, or laser cutting or indeed water cutting method in a plate formed by a thin metal sheet. In other possible embodiments, the perforations may also be formed directly during manufacture by using a method of molding the perforated plate, and are then not formed subsequently to manufacture of the plate.

In addition, unlike with a grid having openings that are uniformly distributed and that are generally of square or rectangular shape, it is possible, by freely changing the size, positioning, shape and/or number of perforations in a perforated plate, to adapt the characteristics relating to the flow rate of air that can be admitted via the same air inlet mouth.

Furthermore, by using such a perforated plate, it is also possible to adapt the characteristics relating to the flow rate of air that can be admitted via the same air inlet mouth without needing to change and to replace the fairing.

Such an invention then makes it possible to select and to install a specific perforated plate, e.g. depending on a mission of the rotorcraft, on the needs of a client wishing to purchase such a rotorcraft, or indeed on the meteorological conditions under which the rotorcraft is going to be flown.

In practice, the perforated plate may advantageously have a percentage of perforations lying in the range 10% to 90%, the percentage representing a through area of the perforation (s) relative to the total surface area of the perforated plate.

Such a percentage of perforations makes it possible to adapt to the various flight conditions and makes it possible to deliver a flow rate of cool air that is optimum regardless of whether the rotorcraft is in a hovering flight phase or in a forward flight phase.

Advantageously, the perforated plate may extend laterally on either side of an anteroposterior plane of the rotorcraft, the anteroposterior plane being arranged vertically and extending from a front zone of the rotorcraft to a rear zone of the rotorcraft.

Thus, such a perforated plate may then intersect the anteroposterior plane of the rotorcraft and does not lie within such a plane.

In an embodiment of the invention, in the anteroposterior plane of the rotorcraft, the perforated plate may comprise at least one generating line such that, in a first direction $D1$ extending from the front zone of the rotorcraft to the rear zone, the generating line(s) extend(s) upwards towards the rotor, the generating line or each of the generating lines comprising a proximal end and a first distal end, the proximal end being arranged in a first plane that, in a second direction $D2$ parallel to the axis of rotation and extending from a lower zone of the rotorcraft towards an upper zone of the rotorcraft, is situated below a second plane that contains the first distal end.

Such a generating line then forms a line of intersection between one face of the perforated plate and the anteroposterior plane of the rotorcraft.

The generating line also extends upwards towards the rotor of the rotorcraft in the second direction $D2$ and extends between its proximal end and its first distal end.

In other words, the perforated plate is inclined significantly towards the rotor of the rotorcraft so that it can capture cool air at different flow rates during hovering and forward flight phases.

Depending on the direction of the incident stream of cool air at the perforated plate, the perforations may have different through areas. In addition, in forward flight, the perforations are of through area dimensioned for a certain flow rate of cool air while the rotorcraft is flying at a certain speed. It is thus possible to dimension the perforations on the basis of a flow rate of cool air that is desired in forward flight.

Furthermore, during hovering flight phases, the perforations are of through area that is larger by means of the angle of inclination of the perforated plate and by means of the angle of incidence of the stream of cool air that is directed substantially perpendicularly to the perforated plate.

Thus, the inclined positioning of the perforated plate also makes it possible to maximize the flow rate of cool air passing through the air inlet for the hovering flight phases.

In practice, the perforated plate may have at least one folded-back portion such that, in the anteroposterior plane of the rotorcraft and in a third direction $D3$ opposite to the first direction $D1$, the generating line(s) forming the folded-back portion (s) extend(s) upwards towards the rotor, the generating line or each of the generating lines comprising a second distal end, the first distal end being arranged in the second plane that, in the second direction $D2$, is situated below a third plane that contains the second distal end.

Such a folded-back portion thus breaks with the inclination of the main portion of the perforated plate and is thus not shaped to match the outer shape of the outer peripheral portion of the fairing.

Advantageously, the perforation or each of the perforations may be of an elongate slot shape.

Such a slot shape may, for example, extend mainly perpendicularly relative to the anteroposterior plane of the rotorcraft.

Furthermore, in another embodiment of the invention, such a slot shape may also extend substantially parallel relative to the anteroposterior plane of the rotorcraft.

More precisely, the perforation or each of the perforations may be of an elongate slot shape that extends upwards as the slot extends away from the anteroposterior plane of the rotorcraft In other words, each of the slots may be not purely perpendicular to the anteroposterior plane of the rotorcraft, but rather it may have a radius of curvature so as to extend upwards towards the rotor going away from the anteroposterior plane of the rotorcraft.

In an advantageous embodiment of the invention, the perforation(s) may include a first perforation arranged in a left portion of the perforated plate relative to the anteroposterior plane of the rotorcraft and a second perforation arranged in a right portion of the perforated plate relative to the anteroposterior plane of the rotorcraft, the first perforation and the second perforation being arranged symmetrically about said anteroposterior plane of the rotorcraft.

In other words, the anteroposterior plane of the rotorcraft may be a plane of symmetry for the perforations in the perforated plate.

Furthermore, the left portion of the perforated plate may be defined as being located to the left of the anteroposterior plane of the rotorcraft when an operative is looking in the third direction D3 that extends from the rear zone of the rotorcraft towards the front zone. By analogy, the right portion of the perforated plate may be defined as being located to the right of the anteroposterior plane of the rotorcraft when an operative is looking in said third direction D3.

In practice, at least in the anteroposterior plane of the rotorcraft, the perforated plate may have a continuous uninterrupted portion.

In this situation, the perforations then do not pass through the anteroposterior plane of the rotorcraft but rather they are arranged exclusively on either side of the anteroposterior plane of the rotorcraft.

Advantageously, the perforated plate may be arranged in the mouth, a peripheral opening extending between the perforated plate and the fairing.

Thus, such a peripheral opening may also allow cool air to pass through it during the hovering and/or forward flight phases of the rotorcraft.

In another advantageous embodiment of the invention, the aerodynamic device may be provided with reversible securing means that, when said rotorcraft is on the ground, allow to remove the perforated plate and to replace the perforated plate with another perforated plate.

In addition, such an arrangement then makes it possible to change the admissible flow-rate characteristics of an air inlet, e.g. between two distinct missions of the same rotorcraft.

In practice, the reversible securing means may be chosen from among the group including screw members of the "quarter turn" type that are actuated manually or by means of a tool such as a screwdriver, pin or latch fastener systems of the "quick release" type, magnets, complementary snap-fastening members, and indexing fingers.

Naturally, conventional securing means may also be used and, for example, have screws or bolts, nuts, or rivets for securing the perforated plate to the fairing of the aerodynamic device.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures may be given the same references in each of them.

As indicated above, the invention relates to a rotorcraft having at least one rotor that at least participates in providing lift, and may also participate in providing propulsion, for the rotorcraft in the air.

Figure 1:
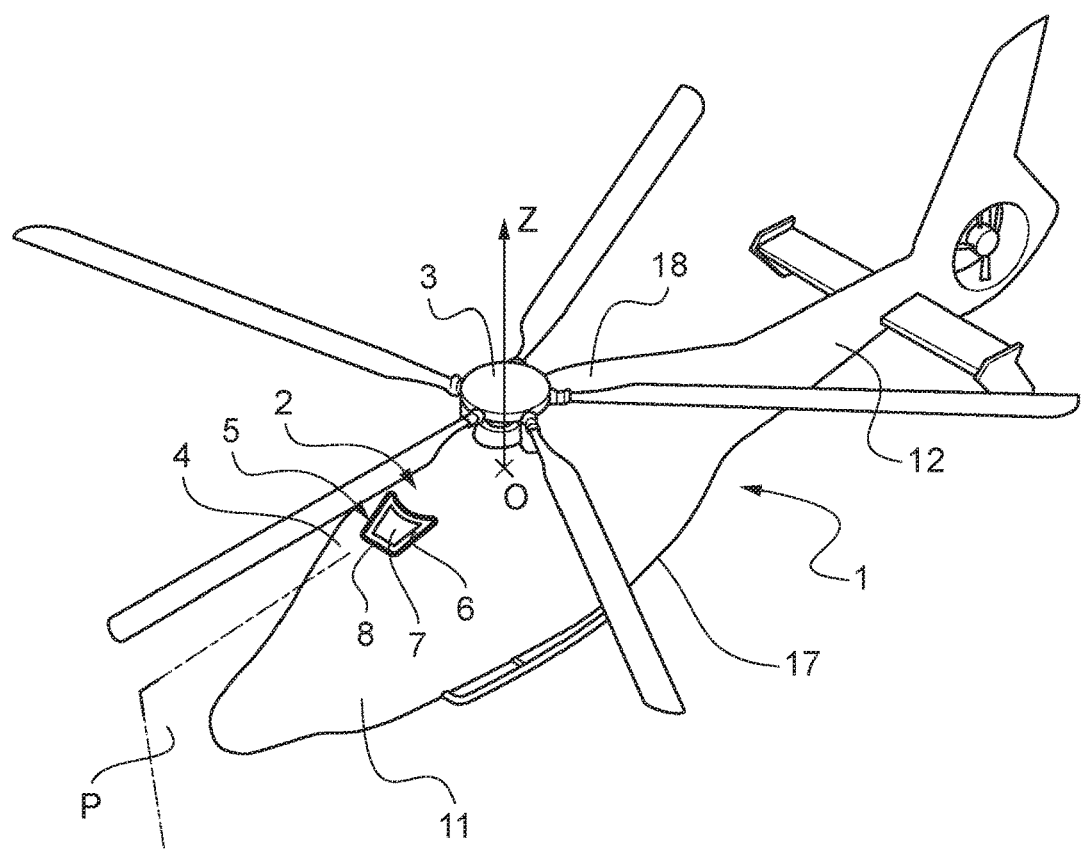
FIG. 1 is a perspective view of a rotorcraft of the invention.

As shown in FIG. 1, such a rotorcraft 1 has an aerodynamic device 2 arranged below the rotor 3 that rotates about an axis of rotation OZ. Furthermore, the aerodynamic device 2 has a fairing 4 that is provided with at least one air inlet 5 so as to make it possible for a stream of cool air to flow from a region situated outside the rotorcraft 1 to another region that is situated inside the rotorcraft 1.

The air inlet 5 has a mouth 6 delimited by an outer peripheral portion 8 of the fairing 4. Furthermore, the aerodynamic device 2 includes a perforated plate 7 arranged at the mouth 6.

In addition, the perforated plate 7 may extend laterally on either side of an anteroposterior plane P of the rotorcraft 1. Such an anteroposterior plane P may be defined as a plane arranged vertically and extending from the front zone 11 of the rotorcraft 1 to a rear zone of the rotorcraft 1.

Furthermore, in a vertical direction, such a rotorcraft 1 has a lower zone 17 that is generally equipped with an undercarriage, and an upper zone 18 that, in particular, includes the aerodynamic device 2 and the rotor 3.

Figure 2:
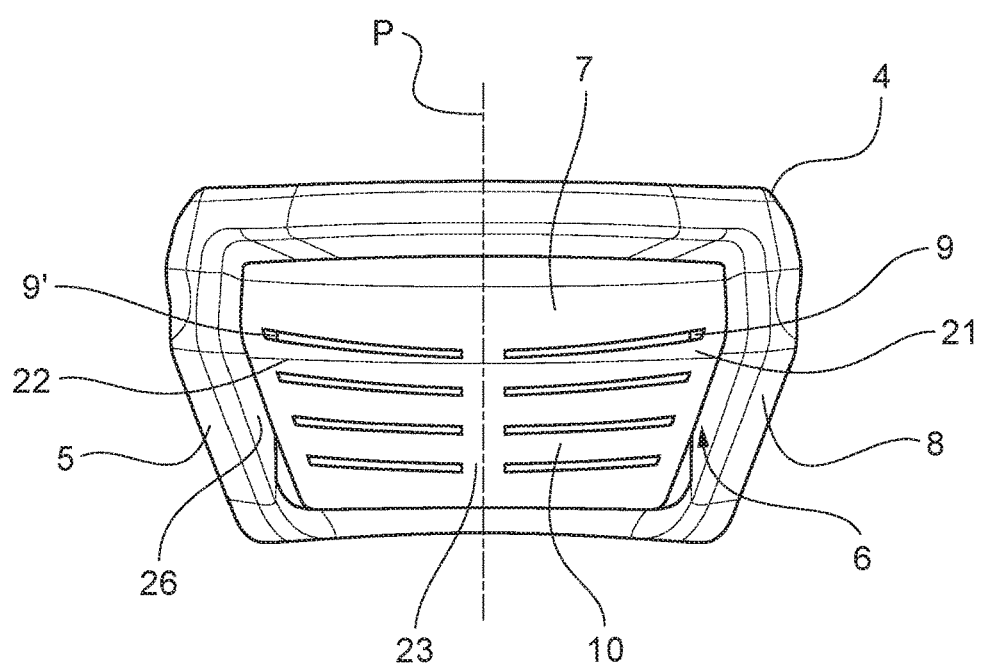
FIG. 2 is a front view of an aerodynamic device of the invention.

As shown in FIG. 2, the perforated plate 7 includes at least one main portion 10 shaped to match the outer shape of the outer peripheral portion 8 of the fairing 4.

In addition, said perforated plate 7 is provided with at least one perforation 9, 9', each perforation 9, 9' being suitable for having the stream of cool air pass through it. For example, said perforated plate 7 may advantageously have a percentage of perforations lying in the range 10% to 90%, the percentage representing a through area of the perforations 9, 9' relative to the total surface area of the perforated plate 7. Preferably, the percentage of perforations may lie in the range 30% to 50%, and makes it possible to impart an optimum flow-rate of air in the air inlet going towards the zone situated inside the rotorcraft.

Such perforations 9, 9' may be of elongate slot shape. Each slot may be arranged to extend upwards as said slot extends away from the anteroposterior plane P of the rotorcraft 1.

The perforated plate 7 may be provided with at least one first perforation 9 arranged in a left portion 21 of said perforated plate 7 relative to the anteroposterior plane P, and with at least one second perforation 9' arranged in a right portion 22 of said perforated plate 7 relative to the anteroposterior plane P.

In addition, the first perforation 9 and the second perforation 9' may advantageously be arranged symmetrically about the anteroposterior plane P.

Furthermore, at least in the anteroposterior plane P, the perforated plate 7 may have a continuous uninterrupted, i.e. non-perforated, portion 23, thereby separating the first perforation 9 from the second perforation 9'.

In addition, a peripheral opening 26 may extend between the perforated plate 7 and the fairing 4. Such a peripheral opening 26 then also makes it possible for the stream of cool air to penetrate to the zone situated inside the rotorcraft 1.

Figure 3:
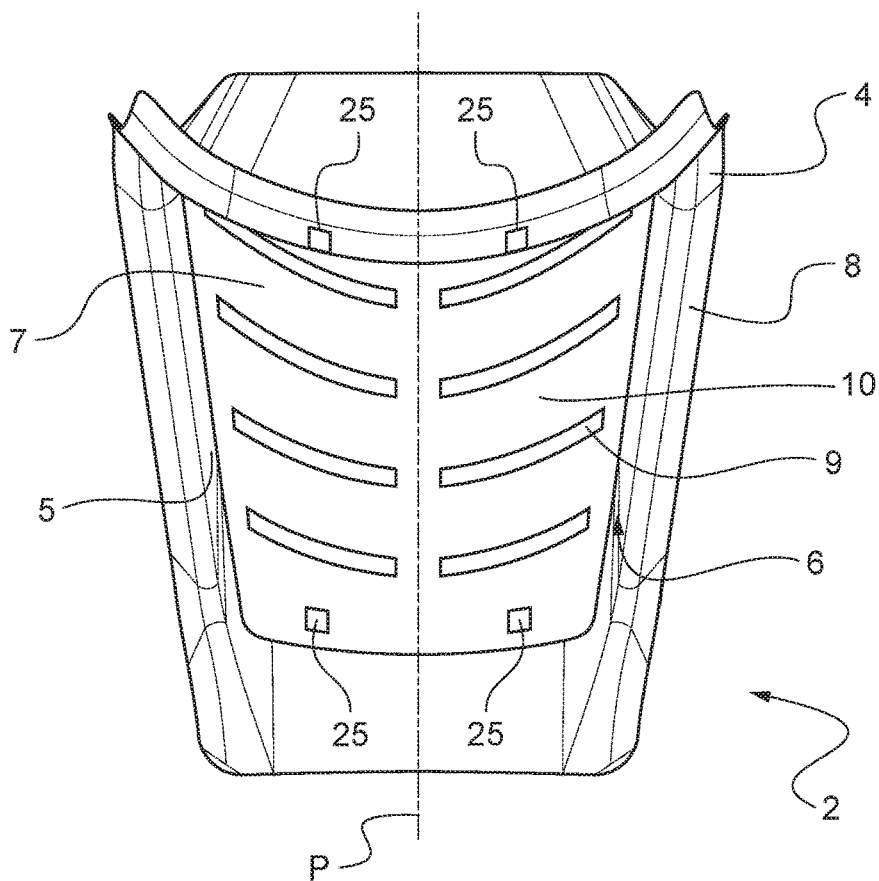
FIG. 3 is a plan view of the aerodynamic device of the invention.

As shown in FIG. 3, the aerodynamic device 2 may also be provided with reversible securing means 25 making it possible, when the rotorcraft 1 is on the ground, for an operative to remove the perforated plate 7 and to replace said perforated plate 7 with another perforated plate (not shown), e.g. depending on needs.

For example, such reversible securing means 25 may be formed by screw members of the "quarter turn" type that are actuated manually or by means of a tool such as a screwdriver, pin or latch fastener systems of the "quick release" type, magnets, complementary snap-fastening members, and indexing fingers.

Figure 4:
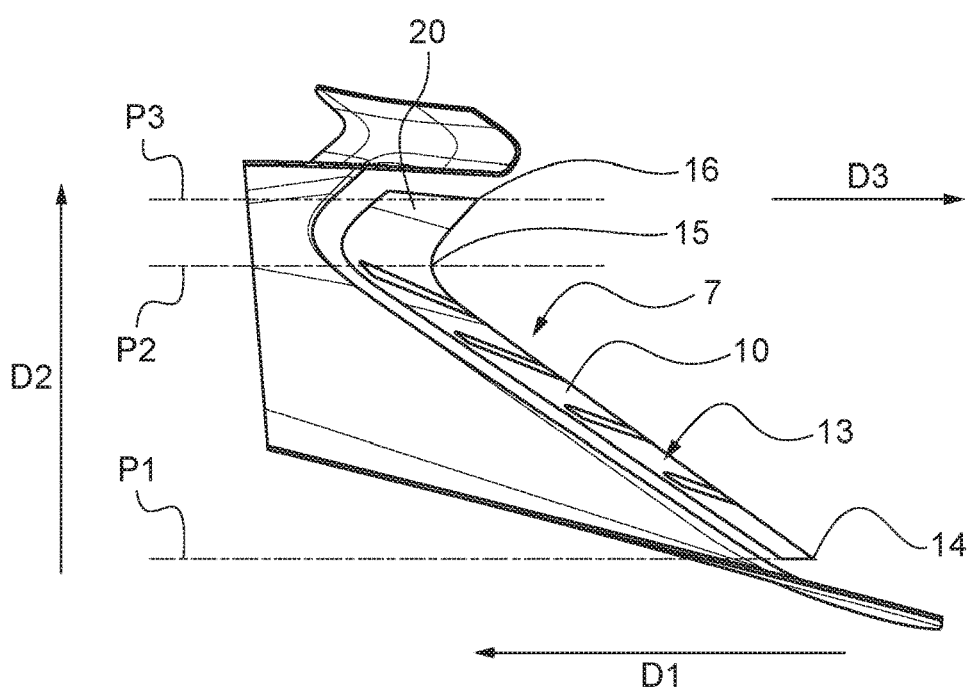
FIG. 4 is a side view of the aerodynamic device of the invention.

As shown in FIG. 4, in the anteroposterior plane P of the rotorcraft 1, the perforated plate 7 may have at least one generating line 13. Furthermore, such a generating line 13 extends upwards towards the rotor 3 in a first direction D1 extending from the front zone 11 of the rotorcraft 1 to the rear zone 12.

In addition, this generating line 13 has a proximal end 14 and a distal end 15. The proximal end 14 is arranged in a first plane P1 that is perpendicular to a second direction D2 extending from the lower zone 17 of the rotorcraft 1 to the upper zone 18 of the rotorcraft 1. The first distal end 15 is arranged in a second plane P2 that is also perpendicular to the second direction D2.

In addition, in the second direction D2, the first plane P1 is positioned below the second plane P2.

Furthermore, the perforated plate 7 may have at least one folded-back portion 20. Thus, in the anteroposterior plane P and in a third direction D3 opposite to the first direction D1 the generating line 13 forming the folded-back portion 20 extends upwards towards the rotor 3.

In addition, the generating line 13 may then also have a second distal end 16. Said second distal end 16 is arranged in a third plane P3 that is also perpendicular to the second direction D2. In the second direction D2, the second plane P2 is positioned below the third plane P3.

Naturally, the present invention can be the subject of numerous variants as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A rotorcraft comprising:
   an aerodynamic device arranged below a rotor, which rotor participates at least in providing lift for the rotorcraft in the air, the rotor being mounted to rotate about an axis of rotation, the aerodynamic device comprising a fairing provided with at least one air inlet for enabling a stream of cool air to flow from a region that is situated outside the rotorcraft to another region that is situated inside the rotorcraft, the at least one air inlet being delimited by an outer peripheral portion of the fairing;
   wherein, at a mouth of the at least one air inlet of the fairing, the aerodynamic device comprises a perforated plate provided with at least one perforation, the stream of cool air being able to pass through the at least one perforation, the perforated plate comprising at least one main portion shaped to match an outer shape of the outer peripheral portion of the fairing;
   wherein the perforated plate extends laterally on either side of an anteroposterior plane of the rotorcraft, the anteroposterior plane being arranged vertically and extending from a front zone of the rotorcraft to a rear zone of the rotorcraft; and
   wherein, in the anteroposterior plane of the rotorcraft, the perforated plate comprises at least one generating line, and wherein, in a first direction extending from the front zone of the rotorcraft to the rear zone, the at least one generating line extends upwards towards the rotor, the at least one generating line comprising a proximal end and a first distal end, the proximal end being arranged in a first plane that, in a second direction parallel to the axis of rotation and extending from a lower zone of the rotorcraft towards an upper zone of the rotorcraft, is situated below a second plane that contains the first distal end,
   wherein the at least one perforation includes a first perforation arranged in a left portion of the perforated plate relative to the anteroposterior plane of the rotorcraft and a second perforation arranged in a right portion of the perforated plate relative to the anteroposterior plane of the rotorcraft,
   wherein the first perforation and the second perforation are arranged symmetrically about the anteroposterior plane of the rotorcraft.

2. The rotorcraft according to claim 1, wherein the perforated plate has a percentage of perforations lying in the range 10% to 90%, the percentage representing a through area of the at least one perforation relative to the total surface area of the perforated plate.

3. The rotorcraft according to claim 1, wherein the perforated plate has a folded-back portion, and wherein, in the anteroposterior plane of the rotorcraft and in a third direction opposite to the first direction, the at least one generating line following the contour of the anteroposterior plane so as to define the contour of the folded-back portion extending upwards towards the rotor, the at least one generating line comprising a second distal end, the first distal end being arranged in the second plane that, in the second direction, is situated below a third plane that contains the second distal end.

4. The rotorcraft according to claim 1, wherein the at least one perforation is of an elongate slot shape.

5. The rotorcraft according to claim 1, wherein the at least one perforation is of an elongate slot shape that extends upwards as the at least one perforation extends away from the anteroposterior plane of the rotorcraft.

6. A rotorcraft comprising:
   an aerodynamic device arranged below a rotor, which rotor participates at least in providing lift for the rotorcraft in the air, the rotor being mounted to rotate about an axis of rotation, the aerodynamic device comprising a fairing provided with at least one air inlet for enabling a stream of cool air to flow from a region that is situated outside the rotorcraft to another region that is situated inside the rotorcraft, the at least one air inlet being delimited by an outer peripheral portion of the fairing;
   wherein, at a mouth of the at least one air inlet of the fairing, the aerodynamic device comprises a perforated plate provided with at least one perforation, the stream of cool air being able to pass through the at least one perforation, the perforated plate comprising at least one main portion shaped to match an outer shape of the outer peripheral portion of the fairing;
   wherein the perforated plate extends laterally on either side of an anteroposterior plane of the rotorcraft, the anteroposterior plane being arranged vertically and extending from a front zone of the rotorcraft to a rear zone of the rotorcraft; and
   wherein the at least one perforation includes a first perforation arranged in a left portion of the perforated plate relative to the anteroposterior plane of the rotorcraft and a second perforation arranged in a right portion of the perforated plate relative to the anteroposterior plane of the rotorcraft, the first perforation and the second perforation being arranged symmetrically about the anteroposterior plane of the rotorcraft.

7. A rotorcraft comprising:
   an aerodynamic device arranged below a rotor, which rotor participates at least in providing lift for the rotorcraft in the air, the rotor being mounted to rotate about an axis of rotation, the aerodynamic device comprising a fairing provided with at least one air inlet for enabling a stream of cool air to flow from a region that is situated outside the rotorcraft to another region that is situated inside the rotorcraft, the at least one air inlet being delimited by an outer peripheral portion of the fairing;

wherein, at a mouth of the at least one air inlet of the fairing, the aerodynamic device comprises a perforated plate provided with at least one perforation, the stream of cool air being able to pass through the at least one perforation, the perforated plate comprising at least one main portion shaped to match an outer shape of the outer peripheral portion of the fairing; and wherein the perforated plate extends laterally on either side of an anteroposterior plane of the rotorcraft, the anteroposterior plane being arranged vertically and extending from a front zone of the rotorcraft to a rear zone of the rotorcraft; and wherein at least in the anteroposterior plane of the rotorcraft, the perforated plate has a continuous uninterrupted portion.

8. The rotorcraft according to claim 1, wherein the perforated plate is arranged in the mouth, a peripheral opening extending between the perforated plate and the fairing.

9. The rotorcraft according to claim 1, wherein the perforated plate is reversibly securable such that, when the rotorcraft is on the ground, the perforated plate is removable and can be replaced with another perforated plate.

10. The rotorcraft according to claim 9, wherein the perforated plate is reversibly securable by reversible securing means, the reversible securing means are chosen from among the group including screw members of the "quarter turn" type, pin or latch fastener systems of the "quick release" type, magnets, complementary snap-fastening members, and indexing fingers.

11. The rotorcraft according to claim 1, wherein the first perforation and the second perforation extend laterally.

12. The rotorcraft according to claim 1, wherein the at least one perforation includes a first plurality of perforations arranged in a left portion of the perforated plate relative to the anteroposterior plane of the rotorcraft and a second plurality of perforations arranged in a right portion of the perforated plate relative to the anteroposterior plane of the rotorcraft.

13. The rotorcraft according to claim 12, wherein the first plurality of perforations and the second plurality of perforations are arranged symmetrically about the anteroposterior plane of the rotorcraft.

14. The rotorcraft according to claim 11, wherein the first perforation and the second perforation are of an elongate slot shape.

15. The rotorcraft according to claim 12, the first plurality of perforations and the second plurality of perforations are each of an elongate slot shape.

16. The rotorcraft according to claim 1, wherein at least in the anteroposterior plane of the rotorcraft, the perforated plate has a continuous uninterrupted portion.

17. The rotorcraft according to claim 6, wherein the first perforation and the second perforation extend laterally.

18. The rotorcraft according to claim 7, wherein the at least one perforation includes a first perforation arranged in a left portion of the perforated plate relative to the anteroposterior plane of the rotorcraft and a second perforation arranged in a right portion of the perforated plate relative to the anteroposterior plane of the rotorcraft, the first perforation and the second perforation being arranged symmetrically about the anteroposterior plane of the rotorcraft.

19. The rotorcraft according to claim 6, wherein the perforated plate is arranged in the mouth, a peripheral opening extending between the perforated plate and the fairing.

20. The rotorcraft according to claim 7, wherein the perforated plate is arranged in the mouth, a peripheral opening extending between the perforated plate and the fairing.

* * * * *